Figure 1:
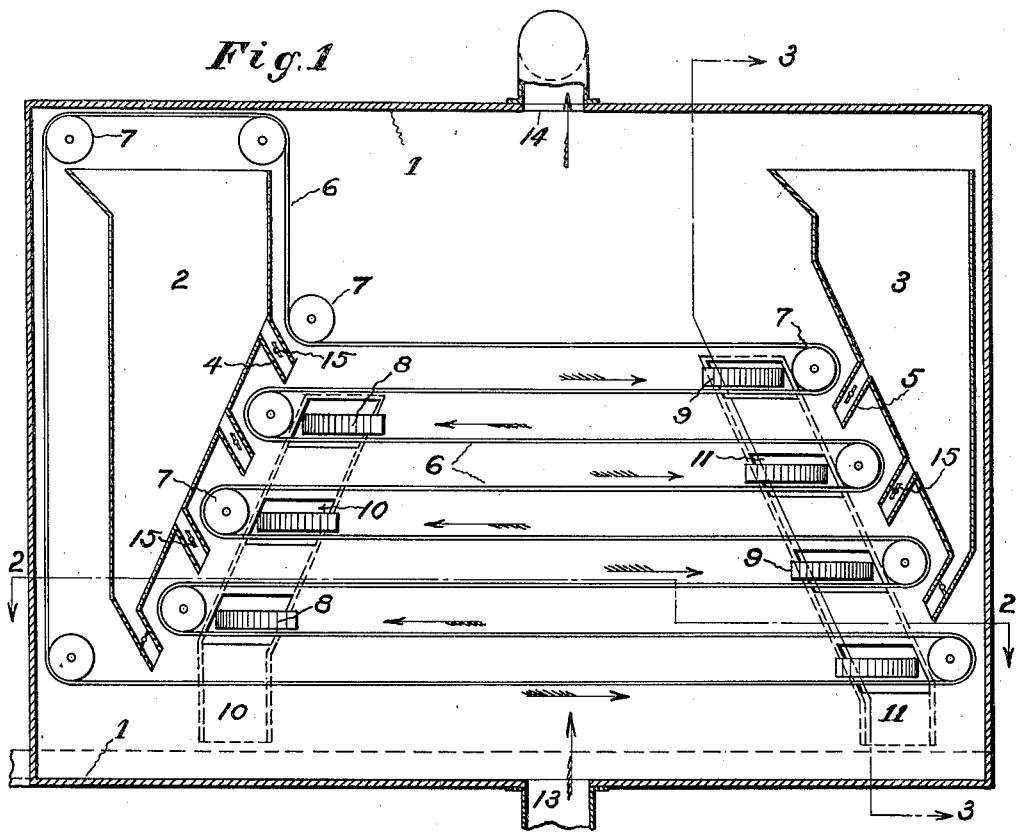

Oct. 19, 1926. 1,603,568
R. E. WILSON
PROCESS AND APPARATUS FOR REMOVING VOLATILE FLUIDS FROM
SOLIDS CONTAINING SAME
Filed June 1, 1922 3 Sheets-Sheet 1

Robert E. Wilson, Inventor
by J. M. Wainwright
The Assistant Secretary of War.
By Chas. Silver,
Patent Section, C.W.S. Attorney Oct. 19, 1926.
R. E. WILSON
1,603,568
PROCESS AND APPARATUS FOR REMOVING VOLATILE FLUIDS FROM
SOLIDS CONTAINING SAME
Filed June 1, 1922
3 Sheets-Sheet 2

Robert E. Wilson, Inventor
by J. M. Wainwright,
The Assistant Secretary of War.
By Chas. Silver,
Patent Section, C.W.S. Attorney

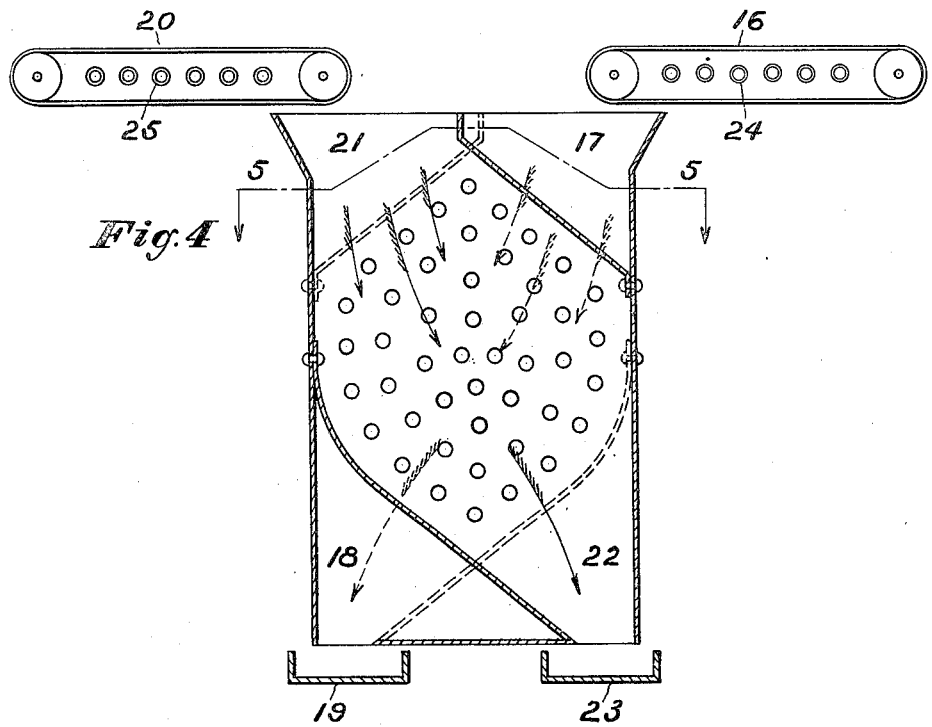
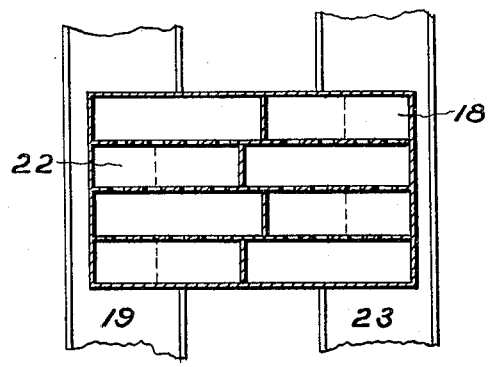

Patented Oct. 19, 1926.

1,603,568

UNITED STATES PATENT OFFICE.

ROBERT E. WILSON, OF CAMBRIDGE, MASSACHUSETTS, ASSIGNOR TO BALTIMORE GAS ENGINEERING CORPORATION, OF BALTIMORE, MARYLAND, A CORPORATION OF MARYLAND.

PROCESS AND APPARATUS FOR REMOVING VOLATILE FLUIDS FROM SOLIDS CONTAINING SAME.

Application filed June 1, 1922. Serial No. 565,093.

This application is a continuation in part of application Serial No. 302,888, filed June 9, 1919.

This invention relates to the removal of volatile fluids such as gases, gaseous materials, vapors and liquids from solids.

Among the objects of this inveniton is the provision of a process and apparatus whereby the removal of condensible volatile fluids from solids is accomplished in a simple, convenient, cheap and highly efficient manner; the process to be carried out either intermittently or preferably continuously.

In carrying out the objects of this invention, there are provided a process and apparatus whereby sorbents, such as are commonly employed in gas mask canisters for removal of poisonous gases or fumes from air for breathing, are brought in close proximity to the material from which the volatile fluids are to be removed and under conditions designed to assist the passage of the volatile fluid from the material to the sorbents.

Previously, such removal and recovery have almost invariably been carried out by means of non-volatile solvents in which the volatile constituent to be removed was dissolved and then extracted by distillation or similar processes. Such procedure has many disadvantages. The use of a solvent requires a large surface exposure for a long time and the absorption of the fluid to be removed is usually incomplete. The recovery of the solvent is dependent upon the change of vapor pressure of the volatile liquid in the solvent with changes of temperature. Usually, only part of the material dissolved in the solvent can be recovered; especially, where the boiling points of the two are not widely separated. The capacity of the solvent up to saturation is usually comparatively low; not over 5 to 10%.

This invention obviates practically all of these difficulties. The process may be very rapid in operation and yet a substantially complete recovery of the fluid may be obtained without difficulty. The material employed for the recovery of the fluid is comparatively cheap, almost completely recoverable and the process may be applied to cases where the use of a solvent is entirely impractical. The process is adapted to a variety of uses; for instance, in the removal of solvents such as gasoline used in making sheet rubber goods, acetone and other volatile solvents used in smokeless powders and pyroxylene manufacture and for the recovery of many other similar solvents used in a wide variety of industries. This invention also includes the removal of water, where solvent recovery is not desired, but carefully regulated humidity conditions are needed, as in the desiccation of food stuffs.

Among the solid sorbing agents available for this process, charcoal, preferably the activated variety, ferric hydroxide gel and silica gel are named as specific examples, but it is to be understood that this invention is not to be limited to these specific examples because other solids having high sorptive properties may be used in lieu of the specific substances named. These solid sorbing agents, which preferably are in the form of porous granules, (although in some instances powdered material may be used) easily and quickly sorb large quantities of various fluids and thus may be used for the extraction of various volatile constituents wherever it may be desirable to do so.

These solid sorbents are more efficient than liquid solvents for the recovery of volatile fluids because sorption by an active solid is much more rapid than solution in a liquid and also because sorbing agents hold relatively large amounts of vapor which exert practically no vapor pressure. The amount of condensed vapor which can be held by a certain weight of these solid sorbents is in general very much greater than that which can be held by an equal weight of liquid, some sorbents being capable of holding, as much as their own weight of certain condensed vapors. In the case of liquid recovery agents it is often difficult to find one which absorbs a large proportion of vapors whereas the solid sorbing agents hold very large amounts of most of the easily condensible vapors. It is possible to recover practically completely the vapors held by such solid sorbing agents by heating to about 100° C. above the boiling point of the fluid recovered, or by passing steam thru, whereas such temperatures would make possible the recovery of but a fraction of the vapors held by recovery liquids. It is also easier to bring air or gases into intimate contact with a solid sorbent than with a liquid solvent.

This invention also contemplates the employment of a mixture of two or more solid sorbing materials.

Specific examples of apparatus suitable for carrying out this invention are shown in the accompanying drawings.

Figure 2:
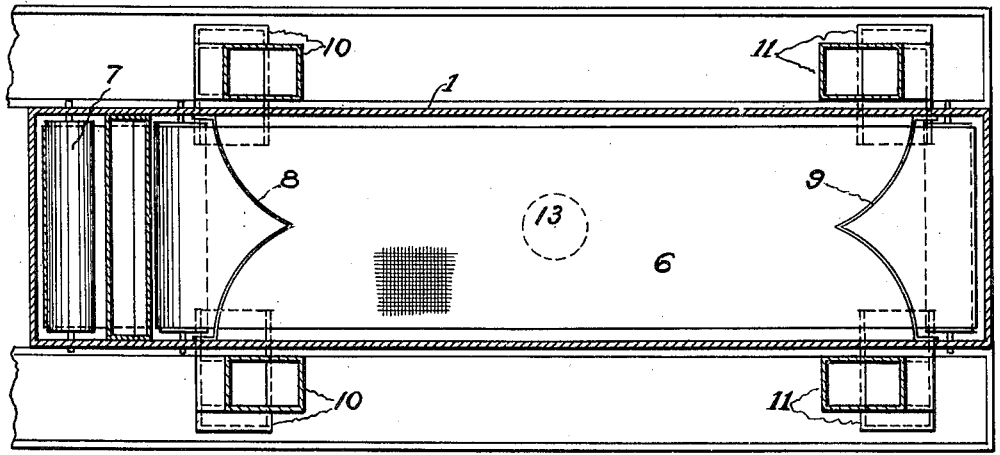
Figure 3:
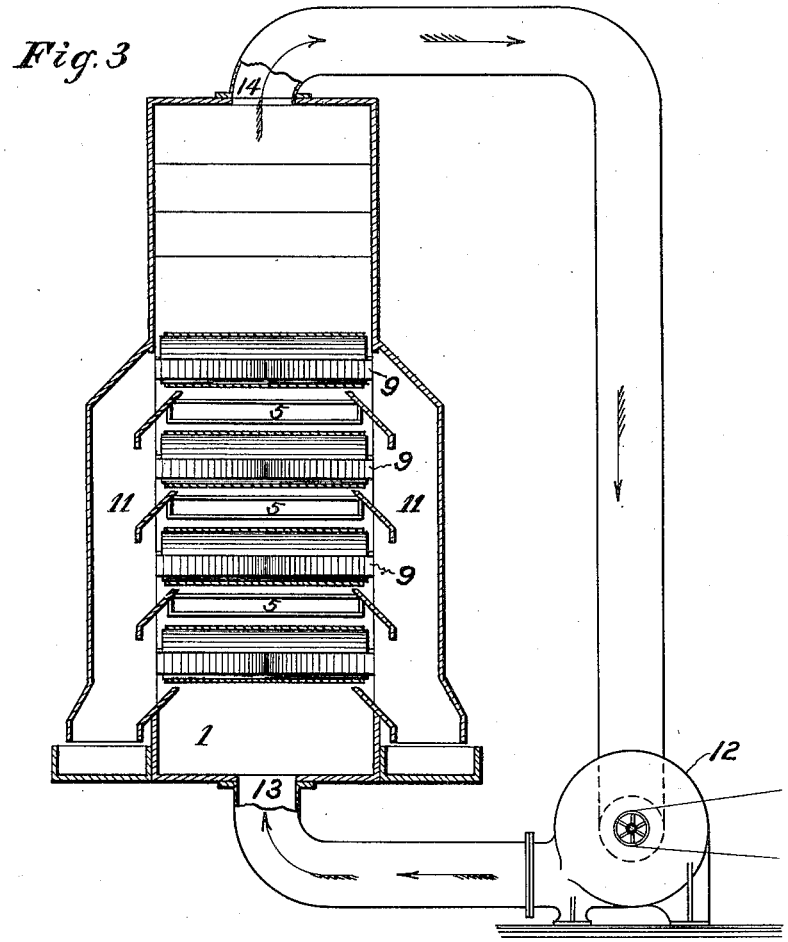

Fig. 1 is a vertical section illustrating the preferred apparatus for carrying out the invention in cases where the solvent is contained in fibrous, granular or otherwise finely divided material. Fig. 2 is a section along the line 2—2 of Fig. 1. Fig. 3 is a section along the line 3—3 of Fig. 1.

Fig. 4 is a vertical section of a modified form of an apparatus. Fig. 5 is a section along the line 5—5 of Fig. 4.

Referring to Figs. 1, 2, and 3, the preferred apparatus comprises a tower or chamber (1) containing the supply hoppers (2) and (3). These hoppers are provided with a plurality of chutes (4) and (5) whereby the materials from the hoppers are discharged upon the carrier or belt (6). This belt as shown is continuous and is trained around a series of pulleys or rollers (7) and forms a plurality of folds with substantially parallel branches or arms. This belt is made of suitable metallic perforated or reticulated material, adapted to withstand the action of the materials and vapors coming in contact therewith. Generally, its length is relatively greater than indicated in the drawing.

The material from which the volatile fluid is removed is delivered from one hopper on to the conveying belt, and sorbing material is delivered from the other hopper on to the conveyor. It will be observed that the movements of the sorbing material and the solid from which the fluid is to be withdrawn are counter to each other. The openwork structure of the belt (6) permits the free passage and interchange of the volatile fluid from the solid material on a branch of the conveyor to the sorbent on the adjacent branches and this interchange is generally assisted by a rapid current of air, as further illustrated. After the solid material and sorbent have traversed substantially the length of the particular branch of the conveyor upon which they are carried, they are removed from the conveyor by means of scrapers (8) and (9), and discharged into the chutes (10) and (11). The sorbent which now carries the volatile fluid is then placed in a suitable retort (not shown) and the volatile fluid removed therefrom by either heat or vacuum or a combination of heat and vacuum. The spent solid from which the volatile fluid has been withdrawn may be removed from the bottom of the chamber (1), and utilized for such purposes as desired.

In general, where sorption of volatile fluids by solids is effected, the operation takes place with evolution of heat which raises the temperature of the sorbing material, and in some instances this heating is considerable. Since the sorbing capacity of the sorbent decreases greatly with the rise in temperature, it is desirable to have the temperature of the sorbing agent as low as possible. This may be accomplished by cooling the sorbing material before it is delivered on the conveyor, thus providing a highly active efficient sorbent for the fluids.

Similarly, the vaporization of the volatile solvent from the solid containing it is accompanied by a cooling effect which tends to slow down the rate of vaporization. In order to counteract the undesirable tendency of the solid to cool and the sorbent to heat, inert gas or air is circulated rapidly through the apparatus. This circulation is accomplished by a blower (12), the air or other inert gas being blown in at the bottom (13) of the chamber (1), and withdrawn at the top (14). This circulation has the effect of minimizing the difference in temperature between the sorbing agent and that of the solid which is being treated for the removal of volatile fluids and of counteracting the heating tendency of the sorbent. Before the air is returned after the passage through the apparatus it may be either heated or cooled to maintain the desired average temperature found suitable for carrying out the process.

The discharge chutes (4) and (5) are provided with suitable gates or discharge regulators (15) for regulation of the quantity of materials to be delivered upon the conveyor.

Although in this specific example the apparatus shows the use of a single belt formed into a series of conveyors, with the alternate conveyors moving in the same direction and counter to the adjacent conveyors, in order to provide relative movement of the sorbing material and the solid from which the fluid is to be recovered, it is to be understood that this invention is not so limited but also contemplates other constructions wherein relative motion of the materials to each other is obtained.

In the modification shown in Figs. 4 and 5, the solid carrying the recoverable fluid is delivered by some suitable means such as the conveying belt (16), to the hopper (17) and goes through the passages (18) and is delivered into a collecting chamber (19). Sorbing material is supplied from the conveyor (20), to the hopper (21) and goes through the passages (22) and is delivered on to the collector (23). It will be observed that the sorbing material and the other solid travel in different directions and in close proximity to each other, the passages (18) and (22) being separated from each other by perforated or reticulated material which permits the volatile fluid to travel from the solid carrying same to the sorbing material. In this construction there is also produced a movement of the materials relative to each other, the material that is discharged into the collector (19) being spent solid and that which is delivered into the collector (23) being the sorbent carrying the volatile fluid.

In order to promote the efficiency of this process it is often desirable to heat the solid from which the fluid is to be recovered and in order to accomplish this result there is provided a suitable means such as the heating coil (24). It is also advisable to either cool the sorbing material before it is delivered on to the conveyor (20) or some cooling means such as the coil (25) may be provided for cooling the sorbent while on the conveyor (20).

The process described herein may be clearly distinguished from prior processes of this character in that this invention involves the sorption of relatively large amounts of fluid and their subsequent recovery.

By the term "sorb", "sorbent", "sorbing", and "sorption", it is intended to include the phenomena of adsorption, absorption, or a combination of both adsorption and absorption.

This invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of removing volatile fluid from solid material containing the same, bringing the solid material in close proximity to but out of contact with sorbing material, and moving one of said materials relatively to the other while in such proximity.

2. In a process of removing volatile fluid from solid containing same, bringing the solid in close proximity to but substantially out of contact with sorbing material, continuously moving said solid and sorbing material relatively to each other while in such proximity, and thus causing the fluid to be volatilized from the sorbent.

3. In a process of removing volatile fluid from solid containing same, bringing a layer of the solid in close proximity to but substantially out of contact with a layer of sorbing material and moving said layers relatively to each other while in such proximity.

4. In a process of removing volatile fluid from solid material containing same, bringing the solid in close proximity to but out of contact with sorbing material, moving one of said materials relatively to the other while in such proximity to each other and minimizing difference in temperature between the sorbent and said solid by circulating inert gas through the substances.

5. In a process of removing volatile fluid from solid containing same, moving alternate layers of the solid containing the fluid in close proximity and relative to but substantially out of contact with alternate layers of sorbing material and minimizing difference in temperature between the sorbent and said solid by circulating inert gas through the substances.

6. In a process of removing volatile fluid from solid containing same, moving alternate layers of the solid and alternate layers of sorbing material in close proximity, substantially parallel and counter to but substantially out of contact with each other and thus causing the fluid to be volatilized from the sorbent, and minimizing difference in temperature between the sorbent and the solid by circulating inert gas through the substances.

7. In a process of removing volatile fluid from solid containing same, moving a layer of the solid and a layer of sorbing material in close proximity and counter to but substantially out of contact with each other and minimizing difference in temperature between the sorbent and said solid by circulating air through the substances.

8. In a process of removing volatile fluid from solid containing same, bringing the solid in close proximity to but substantially out of contact with sorbing material, moving said solid and sorbing material relatively to each other while in such proximity and minimizing difference in temperature between the sorbent and said solid by circulating inert gas through the substances, said gas being brought to the desired temperature before reaching said substances.

9. In an apparatus for removing volatile fluid from a solid, conveying means having a plurality of supporting portions, means for delivering solid material containing the fluid upon alternate ones of said supporting portions, means for delivering upon the other alternate supporting portions sorbing material, said conveying means being disposed to effect a movement relatively to each other of said solid and sorbing material.

10. In an apparatus for removing volatile fluid from a solid, conveying means including a perforated portion for supporting the solid material containing the fluid, said conveying means having another perforated portion arranged adjacent to the first mentioned portion for supporting sorbing material, means for delivering said solid upon the first mentioned portion, means for delivering sorbing material upon the second mentioned portion, and means for effecting a movement relatively to each other of said portions.

11. An apparatus as claimed in claim 9 in which one of the supporting portions of the conveying means is perforated.

12. In an apparatus for removing volatile fluid from a solid, a continuous perforated belt having folds adjacent to each other, means for delivering the solid containing the fluid upon one branch of said folds, means for delivering sorbing material upon the other branch of said folds, said folds serving to keep said solid and said sorbing material substantially out of contact with each other while in said apparatus, and means for effecting movement of said belt.

13. In an apparatus for removing volatile fluid from a solid, conveying means including superposed supporting portions, one of said portions being perforated, means for delivering said solid material upon one end of one of the supporting portions and means for removing the same from the other end of said supporting portion, means for delivering sorbing material upon one end of another one of the supporting portions and means for removing the same from the other end of the latter, and means for effecting movements in different directions of said supporting portions.

14. In an apparatus for removing volatile fluid from a solid, conveying means including superposed supporting portions, some of said portions being perforated, means for delivering at one end of one set of alternate supporting portions, the solid carrying the fluid, scrapers at the other end of said set of supporting portions to remove the solid material therefrom, means for delivering at one end of the other alternate supporting portions the sorbing material scrapers at the other end of the latter supporting portions for removing the sorbing material therefrom, and means for moving the adjacent supporting portions in different directions.

15. In an apparatus for removing volatile fluid from solid, a continuous perforated belt having a plurality of folds adjacent to each other, means for delivering the solid containing the fluid upon one end of the corresponding branches of the folds and scrapers to remove said solid material from the other end, means for delivering sorbing material upon one end of the other corresponding branches of the folds and scrapers to remove said sorbing material from the other ends, the said solid material and sorbing material being delivered upon said branches of the folds at opposite ends thereof, said belt maintaining the solid and sorbing material out of contact while in said apparatus, and means for effecting movement of said belts.

16. In an apparatus for removing volatile fluid from solid, a continuous perforated belt having folds adjacent to each other, means for delivering the solid containing the fluid upon one branch of one fold, means for delivering sorbing material upon the other branch of one fold, means for effecting movement of said belt, said belt maintaining the solid and sorbing material out of contact while in said apparatus, and means for circulating air through the materials upon the folds of belt.

ROBERT E. WILSON.